United States Patent [19]
Weyer

[11] Patent Number: 5,253,726
[45] Date of Patent: Oct. 19, 1993

[54] STEERING ASSEMBLY FOR UTILITY VEHICLES

[76] Inventor: Paul P. Weyer, P.O. Box 398, Enumclaw, Wash. 98022

[21] Appl. No.: 883,670

[22] Filed: May 15, 1992

[51] Int. Cl.$^5$ .............................................. B62D 5/06
[52] U.S. Cl. .................................... 180/132; 180/149; 92/33; 74/89.15
[58] Field of Search ...................... 180/132, 6.48, 253, 180/6.58, 138, 149; 74/89.15, 424.8 R; 92/2, 33

[56] References Cited

U.S. PATENT DOCUMENTS

| | | | |
|---|---|---|---|
| 3,865,207 | 2/1975 | Schwab et al. | 180/44 F |
| 3,961,681 | 6/1976 | Fisher . | |
| 4,003,404 | 1/1977 | Burckhardt | 180/132 X |
| 4,691,795 | 9/1987 | Wehmeyer et al. | 180/6.48 |
| 4,881,419 | 11/1989 | Weyer | 74/89.15 |
| 5,131,486 | 7/1992 | Kato et al. | 180/149 X |

FOREIGN PATENT DOCUMENTS

| | | | |
|---|---|---|---|
| 1120290 | 12/1961 | Fed. Rep. of Germany | 180/253 |
| 1239743 | 7/1971 | United Kingdom | 180/253 |

OTHER PUBLICATIONS

Miller Formless Systems Brochure on M-8100 Automated Slipformer, Miller Formless Co., Inc., 1985, 4 pages.

*Primary Examiner*—Margaret A. Focarino
*Assistant Examiner*—C. Mattix
*Attorney, Agent, or Firm*—Seed and Berry

[57] ABSTRACT

A steering assembly for a utility vehicle having a support frame. The assembly includes a fluid-powered rotary actuator, with a body having a rotatable hollow shaft extending therewithin. An annular piston is mounted within the body about the shaft for reciprocal axial movement and rollers are provided for transmitting torque between the body and the shaft to produce rotational movement of the shaft in response to axial movement of the piston. An axially extendable member extends longitudinally within a central bore of the shaft with a lower end portion projecting out of the body and being attached to forks to which a wheel is rotatably mounted. The central bore of the shaft and the extendable member have meshing straight splines which transmit the rotational drive of the shaft to the extendable member, while allowing free axial movement of the extendable member. The extendable member has a piston portion which defines an interior fluid chamber. An accumulator is in fluid communication with the fluid chamber. The fluid chamber is filled with hydraulic oil, as is a portion of the accumulator. The remainder of the accumulator is filled with compressible nitrogen gas. The extendable member piston portion moves upwardly within the central bore in response to upper movement of the wheel to transmit the force of the upward movement through the hydraulic oil to the compressible fluid for absorption of at least a portion of the transmitted force.

23 Claims, 1 Drawing Sheet

FIG. 1

STEERING ASSEMBLY FOR UTILITY VEHICLES

TECHNICAL FIELD

The present invention relates generally to utility vehicles, and more particularly, to a steering assembly for utility vehicles.

BACKGROUND OF THE INVENTION

In the past, utility vehicles, such as scissor lifts and other equipment, have had limited steering capability, which reduced their usefulness to the user. Typically, a four-wheel scissor lift vehicle has two fixed wheels and two steerable wheels, but the steerable wheels have a limited range of steering. With such an arrangement, it is difficult to steer the vehicle to the desired position.

Utility vehicles typically use hard, solid tires for durability, but such tires provide a hard ride for the operator of the vehicle and any cargo that may be carried by the vehicle. While softer tires can be employed to achieve a softer ride, this means use of a less durable tire. Utilization of a spring suspension is also undesirable.

It will therefore be appreciated that there has long been a significant need for a utility vehicles with improved steering which increases the maneuverability of the vehicle. The steering assembly must not only provide a sufficient steering range, but must also provide sufficient torque to turn the steerable wheels when the vehicle is fully loaded. Preferably, the steering assembly will provide a soft suspension to cushion the vehicle frame, and hence the operator and any cargo, from jarring bumps while allowing use of hard tires. The present invention fulfills these needs and further provides other advantages.

Other features and advantages of the invention will become apparent from the following detailed description, taken in conjunction with the accompanying drawings.

SUMMARY OF THE INVENTION

The present invention resides in a fluid-powered steering assembly for a utility vehicle having a support frame. The steering assembly includes a fluid-powered rotary actuator having a body with a longitudinal axis, and a pair of body ends. First and second fluid ports are provided for introducing pressurized fluids within the body at longitudinally spaced-apart locations. The actuator further has a drive member extending generally longitudinally and coaxially within in the body. The drive member is support for rotational movement relative to the body, and has a central elongated bore therein with an open end at one of the body ends.

The actuator further includes a piston mounted within the body with the first port in fluid communication with one side thereof and the second port in fluid communication with an opposite side thereof to produce reciprocal longitudinal movement of the piston within the body in response to selective application of pressurized fluid to the first and second ports. A torque transmitting member is mounted for reciprocal longitudinal movement within the body. The torque transmitting member engages the body and the drive member to translate longitudinal movement of the piston toward one of the body ends into rotational movement of the drive member relative to the body in a first rotational direction, and longitudinal movement of the piston toward the other of the body ends into rotational movement of the drive member relative to the body in a second rotational direction opposite the first rotational direction.

The actuator also includes an axially extending member extending generally longitudinally and coaxially within the central bore with an end portion projecting out of the central bore open end to a position beyond the body. The extendable member is axially movable within the central bore, and is rotatably driven by the drive member for rotation with the drive member. The extendable member has a piston portion located within the central bore to define an interior fluid chamber. A third fluid port is provided in fluid communication with the central bore fluid chamber.

The steering assembly further includes a wheelsupported member. One of the body or the extendable member is attached to the frame, and the other is attached to the wheel support member for rotation therewith relative to the frame. The wheel is rotatably mounted to the wheel support member in a position to rollingly support the frame. A wheel support member is rotatable to turn the wheel to steer the frame to the left or the right. The steering assembly further includes an accumulator connected to the third fluid port. The central bore fluid chamber and a portion of the accumulator are filled with a substantially noncompressible hydraulic fluid and the remainder of the accumulator is filled with a compressible fluid. The extendable member piston portion moves within the central bore in response to upward movement of the wheel to transmit the force of the upward movement through the hydraulic fluid to the compressible fluid in the accumulator for absorption of at least a portion of the transmitted force. With the steering assembly of the present invention, the wheel is steered by controlling rotation of the drive member relative to the body, and shock that would be produced by sudden upward movement of the wheel is transmitted to and absorbed by the compressible fluid to cushion the ride of the frame.

In a preferred embodiment of the invention, the body is attached to the frame at its lower end, and the opening of the central bore is at the body lower end. Further, the extendable member extends downward out of the central bore open end to a position below the body lower end. The wheel support member is mounted to a lower end portion of the extendable member, and the wheel support member is rotatable by the drive member transmitting rotational force thereto through the extendable member.

In the illustrated embodiment of the invention, an interior surface portion of the central bore and an exterior surface portion of the extendable member have longitudinally extending, straight splines which mesh together to provide rotational drive from the drive member to the extendable member while permitting uninhibited longitudinal movement of the extendable member within the central bore, within at east a limited range. The extendable member has a stop member to engage an upper end of the central bore splines to limit the extent of downward travel of the extendable member within the central bore. Further, the extendable member has a stop member to engage the drive member to limit the extent of upward travel of the extendable member within the central bore.

In this illustrated embodiment of the invention, the drive member is a hollow shaft with an end cap located toward the body upper end, closing an upper open end of the central bore. The third fluid port is formed in the end cap. The extendable member is slidably disposed within the central bore, and a seal is retained by the drive member within the central bore toward the body lower end to provide a fluid-tight seal between the drive member and the extendable member piston portion as the extendable member moves axially within the central bore.

In one embodiment, a separate accumulator is used, while in another embodiment the central bore defines both an interior fluid chamber portion filled with non-compressible hydraulic fluid, and an accumulator chamber portion is in fluid communication with the interior fluid chamber portion. The accumulator chamber portion contains the compressible fluid.

Other feathers and advantages of the invention will become apparent from the following detailed description, taken in conjunction with the accompanying drawings.

DETAILED DESCRIPTION OF THE INVENTION

Figure 1:
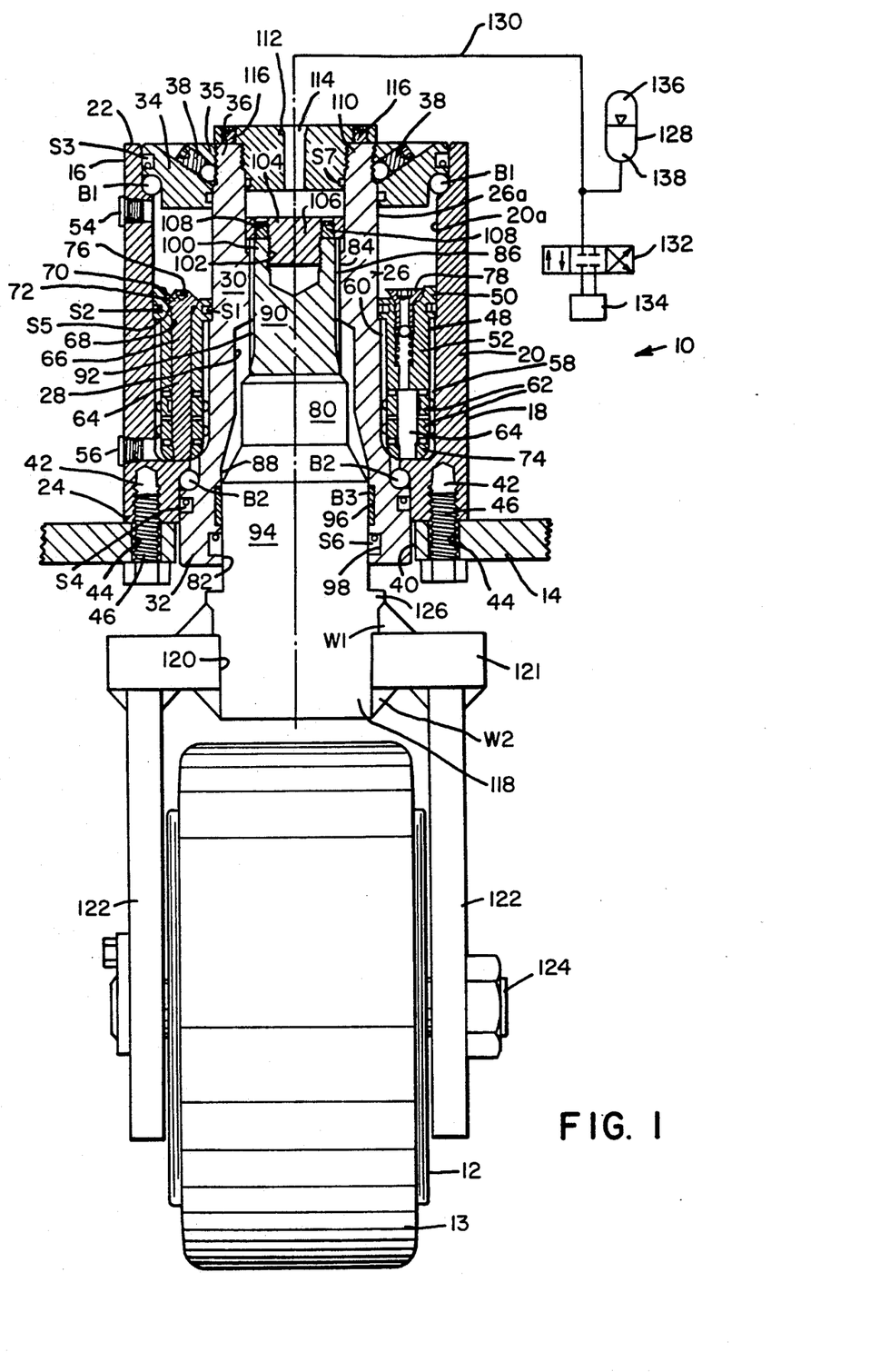
FIG. 1 is a side elevational cross-sectional view of a utility vehicle steering assembly embodying the present invention.

As shown in the drawings for purposes of illustration, the present invention is embodied in a utility vehicle steering assembly 10. The steering assembly 10 includes a wheel 12 which supports a vehicle frame 14 above the ground. The wheel 12 includes a hard, solid tire 13. The steering assembly 10 also includes a fluid-powered rotary actuator 16, for steering of the wheels 12, as will be described in detail below. Of course, the vehicle frame 14 will also be supported by one or more of the steering assemblies or other groundengaging wheel or member arrangements. Propulsion will also typically be provided.

The actuator 16 includes an elongated housing or body 18 having a cylindrical sidewall 20, and upper and lower ends 22 and 24, respectively. An elongated shaft 26 is coaxially positioned within the body 18 and supported for rotation relative to the body. The drive shaft 26 has a hollow center bore 28 extending the full length of the drive shaft.

In the illustrated embodiment, the drive shaft 26 has an elongated portion 30 axially projecting substantially the full length of the body 18 and an enlarged lower flange portion 32 at the lower end 24. The shaft flange portion 32 protrudes beyond the body lower end 24. The elongated shaft portion 30 has an annular nut 34 threadably attached thereto at the body upper end 22. The shaft nut 34 has a threaded interior portion 35 threadably received on a correspondingly threaded perimeter portion 36 of the elongated shaft portion 30, and the shaft nut rotates with the drive. The shaft nut 35 is locked in place against rotation relative to the drive shaft 26 by pair of set screws 38.

The drive shaft 26 is rotatably supported within the body 18 against both axial and radial thrust loads by a plurality of ball bearings B1 at the body first end 22 disposed between confronting and corresponding circular ball races formed in the body sidewall 20 and the shaft nut 34, and by a plurality of ball bearings B2 at the body second end 24 disposed between confronting and corresponding circular ball races formed in the body sidewall and the shaft flange portion 32.

The actuator 16 is positioned above the vehicle frame 14 with the body lower end 24 against the vehicle frame 14 and the shaft flange portion 32 projecting downward through an aperture 40 in the vehicle frame. The body sidewall 20 at the body lower end 24 has a plurality of outwardly opening, threaded holes 42 and the vehicle frame 14 has a corresponding plurality of attachment bolt holes 44 f or rigid coupling of the body 18 to the vehicle frame by a plurality of threaded bolts 46.

Within the body 18, an annular piston sleeve 48 is coaxially and reciprocally mounted about the drive shaft 26. The piston sleeve 48 has an annular head portion 50 positioned toward the body first end 22 and a cylindrical sleeve portion 52 fixedly attached to the head portion and extending axially therefrom toward the body second end 24.

The head portion 50 carries a conventional inner seal S1 disposed to provide a seal between the head portion and a corresponding, longitudinally extending, smooth wall portion 26a of the drive shaft 26, and a conventional outer seal S2 disposed to provide a seal between the head portion 50 and a corresponding, longitudinally extending, smooth wall portion 20a of the body sidewall 20. The head portion 50 and the corresponding inner and outer seals S1 and S2 define fluid-tight compartments to each side of the head portion toward the body first end 22 and the body second end 24. The smooth wall portion 26a of the drive shaft 26 and the smooth wall portion 20a of the body sidewall 20 have sufficient axial length to accommodate the full end-to-end reciprocating stroke travel of the piston sleeve 48 within the body 18.

Reciprocation of the piston sleeve 48 within the body 18 occurs when hydraulic oil or air under pressure selectively enters through one or the other of a port 54 and a port 56 located in the body sidewall 20. The ports 54 and 56 each communicates with one of the fluid-tight compartments correspondingly positioned to one or the other side of the piston head portion 50. Conventional seals S3 and S4 are disposed between the shaft nut 36 and the body 18 toward the body first end 22, and between the shaft flange portion 32 and the body 18 toward the body second end 24 to prevent fluid leakage from the compartments as the drive shaft 26 rotates.

The application of fluid pressure via the port 54 to the compartment toward the body first end 22 produces axial movement of the piston sleeve 48 toward the body second end 24. The application of fluid pressure via the port 56 to the compartment toward the body second end 24 produces axial movement of the piston sleeve 48 toward the body first end 22. The actuator 16 provides relative rotational movement between the body 18 and the drive shaft 26 through the conversion of linear movement of the piston sleeve 48 into rotational movement of the drive shaft in a manner well known in the art.

An inward facing surface portion of the body sidewall 20 extending generally between the body smooth wall portion 20a and a position axially inward of the body second end 24 has cut therein a plurality of inner helical body grooves 58. An outward facing surface portion of the drive shaft 26 extending generally between the drive shaft smooth wall portion 26a and the shaft flange portion 32 has cut therein a plurality of outer helical shaft grooves 60. The helical body and shaft grooves 58 and 60 extend about the body sidewall 20 and the drive shaft 26, respectively. The helical shaft grooves 60 of the drive shaft 26 are located generally opposite the helical body grooves 58 of the body sidewall 20 and positioned radially inward therefrom to define a circumferential space therebetween. The sleeve portion 52 of the piston sleeve 48 supports a plurality of freely rotatable disk rollers 62 disposed in this circumferential space. The helical body grooves 58 have an opposite hand or direction of turn from the helical shaft grooves 60. The number of grooves or groove starts comprising the plurality of helical body and shaft grooves 58 and 60 may vary from design to design, but preferably the numbers used are interrelated.

The rollers 62 are rotatably retained in fixed axial and circumferential position relative to the piston sleeve 48 as the piston sleeve reciprocates within the body 18 during fluid-powered operation of the actuator 16 by a plurality of cylindrical shaft spindles 64. Each of the spindles 64 has a coaxially extending and integrally formed support arm position portion 66 disposed in one of a plurality of bore holes 68 formed in the piston sleeve 48. The bore holes 68 are evenly circumferentially spaced apart about the piston sleeve 48 and extend axially fully through the sleeve portion 52 and the piston head portion 50 of the piston sleeve.

The support arm portion 66 has a head 70 received in a countersunk end portion 72 of the bore hole 68 in the piston head portion 50 to recess the support arm head and thus prevent it from being exposed to impact when the head portion 50 of the piston sleeve 48 reaches its full end limit of travel toward the body first end 22. A conventional seal S5 is provided on each support arm portion 66 to prevent fluid leakage between the compartments to each side of the head portion 50.

At the body second end 24, the spindles 64 project into the circumferential space between the body sidewall 20 and the drive shaft 26 and each spindle holds a pair of the rollers 62 restrained against axial movement relative to the spindle for rotation about the spindle on an axis in parallel axial alignment with the body 20.

The spindles 64 retain the rollers 62 in circumferentially distributed, spaced-apart positions within the circumferential space about the drive shaft 26, with each of the rollers in seated engagement and coacting with both the helical body grooves 58 and the helical shaft grooves 60 for transmitting force between the body 18, the drive shaft 26, and the piston sleeve 48. Each ridge of the rollers 62 is positioned for rolling travel in corresponding grooves of both the helical body grooves 58 and the helical shaft grooves 60, and is axially positioned in generally the same plane as corresponding rollers on the other spindles 64.

The rollers 62 each have a roller bore with a self-lubricating coating for rotatably receiving a smooth surface end portion of one of the spindles 64 which projects outward beyond the end of the sleeve portion 52 of the piston sleeve 48. The spindle end portion also has a self-lubricating coating. The rollers 62 are held in place on the spindles 64 by an annular spindle support plate 74. The support plate 74 has a plurality of circumferentially spaced-apart, threaded holes arranged so each hole threadably receives therein a threaded free end portion of one of the spindles 64. The support plate 74 reduces problems and possible failure under the large loads which may be encountered by the cantilever-supported spindles. The coaction of the rollers 62 and the helical body and shaft grooves 58 and 60 comprise the linear-to-rotary conversion means which produces rotation of the drive shaft 26 as the piston sleeve 48 reciprocates, as will now be described. Alternative linear-to-rotary conversion means may also be used, such as intermeshing splines or balls and ball grooves.

Linear reciprocation of the piston sleeve 48 produces rotation of the piston sleeve and the drive shaft 26 through the force-transmitting capability of the rollers 62. Through the selective application of fluid pressure to one or the other of the fluid-tight compartments via the ports 54 and 56, torque is transmitted by the rollers 62 to the piston sleeve 48 through their coaction with the helical body grooves 58. The axial force created by fluid pressure on the head portion 50 causes the rollers 62 to roll along the helical body grooves 58 and transmit torque to the piston sleeve 48. The transmitted torque causes the piston sleeve 48 to rotate as it moves axially. The resulting linear and rotational movement of the piston sleeve 48 transmits both axial and rotational force to the drive shaft 26 through the coaction of the rollers 62 with the helical shaft grooves 60. The transmitted force causes the drive shaft 26 to rotate relative to the body 18 since axial movement of the shaft is restricted by bearings B1 positioned toward the body first end 22 between the shaft nut 34 and the body sidewall 20, and bearings B2 positioned toward the body second end 24 between the shaft flange portion 32 and the body sidewall 20. As such, axial movement of the piston sleeve 48 produced by fluid pressure is converted into relative rotational movement between the body 18 and the drive shaft 26. The resulting movement of the rollers 62, body 18 and shaft 26 when viewed from the body ends is much like the movement of a planetary gear arrangement.

The actuator 16 is provided with means for eliminating backlash in the force-transmitting parts and for axially preloading of the piston sleeve 48 and the rollers 62. Backlash results for the slack or free movement between the force-transmitting parts of the actuator. The slack is usually due to the seizing of the helical body and shaft grooves 58 and 60, and the rollers 62 positioned therein, which transmit force between the body 18 and the shaft 26 through the reciprocation of the piston sleeve 48. Backlash occurs as the piston sleeve 48 moves from one axial direction to the other within the body as it reciprocates.

As previously described, each of the spindles 64 has a pair of rollers 62 rotatably mounted thereon. To provide for backlash elimination and preloading, the rollers 62 are sized to produce an adjustment space therebetween when installed on the spindle end portion and positioned within the body 18 with the shaft 26 and piston sleeve 48 in place. As will be described, this adjustment space allows for sufficient axial movement of the pair of rollers on a spindle toward each other to firmly engage between the ridge portions of the two rollers, one of the ridge portions of the helical body grooves 58 and one of the ridge portions of the helical shaft grooves 60.

The two rollers 62 on a spindle are selectively and adjustably moved toward each other by adjustably turning the spindle 64 carrying the two rollers using a tool inserted into a recess 76 of the head 70 of the spindle with the shaft nut 34 removed prior to fluid-powered operation of the actuator 16. By so adjustably turning the head 70, the support plate 74 is drawn toward the body first end 22 and the two rollers 62 on the spindle 64 being adjusted are caused to be moved together and clamp therebetween the ridge portions of the corresponding helical body and shaft grooves 58 and 60. Since the turning of one spindle 64 to adjust out slack and to preload the rollers 62 also causes the annular support plate 74 to have a similar effect, although to a lesser extent, on the other rollers, the backlash elimination adjustment should be accomplished by progressively turning of all spindles in sequence to partially and gradually adjust out backlash.

When substantially all slack between the rollers 62 and the helical body grooves 58 and between the rollers and the helical shaft grooves 60 has been eliminated, further axial adjustment of the rollers will apply an axial preloading force between the rollers and the helical body and shaft grooves. The spindles 64 may then be locked in place using lock screws 78 which each lock one of the spindles against further rotation. The shaft nut 34 is then placed on the shaft 26 to ready the actuator 16 for fluid powered operation. Should usage of the actuator 16 cause wear of the helical body or shaft grooves 58 or 60 or the rollers 62 seated therein, or should slack occur for any other reason, the slack can be removed in the same manner described above by further axial adjustment of the spindles after the shaft nut 34 is removed.

An axially extendable member 80 is coaxially disposed within the central drive shaft bore 28 and projects out an open lower end 82 of the drive shaft bore toward the body second end 24 and fully through the vehicle frame aperture 40. The drive shaft bore 28 has an interiorly splined portion 84 with axially extending straight spines 86 located toward the body first end 22 and an enlarged diameter smooth-walled portion 88 located toward the body second end 24 which terminates as the open lower end of the drive shaft bore. The extendable member 80 has a lengthwise portion 90 with axially extending straight splines 92 which correspond to and mesh with the straight splines 86 of the drive shaft bore 28 to prevent rotation of the extendable member relative to the drive shaft 26 and to cause the extendable member to rotate with the drive shaft, while allowing free axial movement of the extendable member relative to the drive shaft.

The extendable member 80 has an enlarged diameter smooth-walled portion 94 which is in axial sliding engagement with the smooth-walled portion 88 of the drive shaft bore 28 to guide the extendable member as it axially moves within the drive shaft bore 28. The smooth-walled portion 88 of the drive shaft bore 28 has a pair of circumferential grooves 96 and 98 cut therein. The groove 96 receives a bearing B3 to engage and guide the smooth-walled portion 94 of the extendable member 80. The groove 98 receives a seal S6 to provide a seal between the smooth-walled portion 94 of the extendable member 80 and the smooth-walled portion 88 of the drive shaft bore 28.

An upper end 100 of the extendable member 80 has a threaded aperture 102 to threadably receive a threaded stop cap 104. The stop cap 104 has a head portion 106 with an outer diameter sufficient to engage the upper ends of the straight splines 86 of the drive shaft bore 28 and thereby limit downward travel of the extendable member 80. The stop cap 104 prevents the extendable member 80 from falling out of the drive shaft bore 28 in the event the vehicle frame 14 is picked up so that the wheel 12 is above the ground. The outer diameter of the head portion 106 is sized sufficiently smaller than the interior diameter of the drive shaft bore 28 in the area above the straight splines 86 to permit hydraulic fluid to pass by during operation of the steering assembly 10. Lock screws 108 lock the stop cap 104 against rotation relative to the extendable member 80. It is noted that a snap ring could be used in place of the stop cap 104 to limit downward travel of the extendable member 80.

The drive shaft bore 28 has a threaded open upper end 110 toward the body first end 22 to threadably receive a threaded plug 112 with a center fluid port 114 formed therein. A conventional seal S7 is carried by the plug 112 to provide a seal between the plug and the drive shaft bore 28. Lock screws 116 lock the plug 112 against rotation relative to the drive shaft 26.

A lower end portion 118 of the extendable member 80 is positioned within an aperture 120 of an attachment bracket 121 and is fixedly attached thereto by welds W1 and W2. A pair of forks 122 is fixedly attached to and extends downward from the attached bracket 121. The wheel 12 is rotatably mounted between the forks on an axle 124 having a rotational axis transverse to the extendable member 80.

Through the selective application of fluid pressure to the ports 54 and 56 of the body 18, the drive shaft 26 is selectively rotated. Since, as noted above, the extendable member 80 rotates with the drive shaft 26, the extendable member and the forks 122 attached thereto are also rotated to turn the wheel 12 and provide steering for the vehicle frame 14. The drive shaft 26 of the illustrated embodiment of the invention can be rotated through at least 180° to allow selective steering to the wheel 12 within a steering range at least 90° to the left of a center position and 90° to the right of the center position. Typically, at the center position the vehicle frame 14 moves in a straight line forward or backward. With the described steering assembly 10, the high torque output of the actuator 16 is applied to the wheel 12 for easy turning even when the vehicle frame 14 carries a large load.

The lower end portion 118 of the extendable member 80 has a stop shoulder 126 sized larger than the diameter of the open lower end 82 of the drive shaft bore 28 to engage the shaft flange portion 32 of the drive shaft 26 and thereby limit upward travel of the extendable member within the drive shaft bore.

As will be described below, the steering assembly 10 can be adjusted to provide a smoother ride than a solid connection to the vehicle frame 14 without the use of springs. This is accomplished, in part, by applying pressurized hydraulic oil to the interior of the drive shaft bore 28. The seal S6 of the smooth-walled portion 88 of the drive shaft bore 28 toward the body second end 24 and the seal S7 of the plug 112 at the end of the drive shaft bore toward the body first end 22 make the interior of the drive shaft bore a fluid-tight chamber in which the extendable member 80 is axially movable.

With the application of hydraulic oil under pressure to the drive shaft bore 28 through the port 114 in the plug 112, the enlarged diameter, smooth-walled portion 94 of the extendable member 80 acts as a piston head and causes the extendable member to move downward relative to the drive shaft 26. Since the body 20 of the actuator 16 is attached to the vehicle frame 14, the extent the extendable member 80 will move for a given amount of fluid pressure applied to port 114 will depend on the weight of the vehicle frame and any load it carries. In use, a sufficient pressure would typically be applied to place the extendable member 80 at about the middle of its range of travel between the downward end limit of travel where the stop cap 104 engages the upper ends of the straight splines 86 and the uppermost end limit of travel where the stop shoulder 126 engages the shaft flange portion 32, as is shown in FIG. 1. Since the wheel 12 is in rolling contact with the ground during normal usage of the steering assembly 10, extending the extendable member 80 downward relative to the drive shaft 26 actually causes the raising of the body 18 and the vehicle frame 14 to which it is attached.

Since hydraulic oil is substantially noncompressible, a resilient means for absorbing shock must be utilized. This is accomplished by the use of nitrogen gas. The port 114 in the plug 112 is connected to an accumulator 128 by a hydraulic line 130. The accumulator 128 is charged with a preselected amount of nitrogen gas, or another compressible fluid. Pressurized hydraulic oil is added to the interior chamber of the drive shaft bore 28, the hydraulic line 130 and the accumulator 128 through a valve 132 from a source 134 of hydraulic oil, such as a pressurized source of hydraulic oil carried by the vehicle frame 14 for purposes of operating other hydraulic devices. The nitrogen gas in the accumulator 128 is compressed somewhat by the pressurized hydraulic oil to form a head 136 of pressurized nitrogen gas in the accumulator above a quantity of oil 138 therein. Sufficient hydraulic oil is applied that the extendable member 80 will assume a mid-range position as shown in FIG. 1 under the weight of the vehicle frame 14 and a typical size load to be carried by the vehicle frame.

The shock absorbing ability of the steering assembly 10 is provided by the compressible nature of the nitrogen gas. Vertical movement of the wheel 12 relative to the vehicle frame 14, such as when the wheel strikes a bump, is transmitted to the extendable member 80 to axially move the extendable member relative to the drive shaft 26. As noted above, the enlarged diameter smoothwalled portion 94 of the extendable member 80 acts as a piston within the drive shaft bore 28 and transmits the axial force through the hydraulic oil in the drive shaft bore and the hydraulic line 130 to the nitrogen gas in the accumulator 128 which absorbs the energy of the shock to provide a smooth ride for the vehicle frame 14. The softness of the ride can be adjusted when desired by adding pressurized hydraulic oil using the valve 132. If a harder ride is desired, additional hydraulic oil from the pressurized source 134 can be added using the valve 132, or if a softer ride is desired, hydraulic oil can be bled off. This provides the ability to adjust the softness of the ride, and also to adjust for the varying weight loads that might be carried by the vehicle frame 14.

While the steering system 10 has been described as using a separate accumulator 128, the nitrogen gas can be added directly to the interior chamber of the drive shaft bore 28, assuming the chamber is designed with sufficient size. In this embodiment, a lower portion of the interior chamber of the drive shaft bore 28 holds hydraulic oil and an upper portion of the interior chamber holds the nitrogen gas. The port 114 may still be connected via the hydraulic line 130 through the valve 132 to a source 134 of hydraulic oil as above described.

It is noted that the hydraulic oil in the interior chamber of the drive shaft bore 28 also serves to lubricate the straight splines 86 and 92 as the extendable member 80 moves axially within the drive shaft bore 28 as a result of the steering assembly 10 performing its shock absorbing function.

It will be appreciated that, although specific embodiments of the invention have been described herein for purposes of illustration, various modifications may be made without departing from the spirit and scope of the invention. Accordingly, the invention is not limited except as by the appended claims.

What is claimed is:

1. A steering assembly for a utility vehicle having a support frame, comprising:
 a fluid-powered rotary actuator, including:
  a body attached to the frame, said body having a longitudinal axis, and body upper and lower ends;
  first and second fluid ports for introducing pressurized fluid within said body at longitudinally spaced-apart locations;
  a drive member extending generally longitudinally and coaxially within said body, said drive member being supported for rotational movement relative to said body, said drive member having a central elongated bore therein with an open end at said body lower end;
  a piston mounted within said body with said first port in fluid communication with one side thereof and said second port in fluid communication with an opposite side thereof to produce reciprocal longitudinal movement of said piston within said body in response to selective application of pressurized fluid to said first and second ports;
  a torque-transmitting member mounted for reciprocal longitudinal movement within said body, said torque-transmitting member engaging said body and said drive member to translate longitudinal movement of said piston toward said body upper end into rotational movement of said drive member relative to said body in a first rotational direction, and longitudinal movement of said piston toward said body lower end into rotational movement of said drive member relative to said body in a second rotational direction opposite said first rotational direction;
  an axially extendable member extending generally longitudinally and coaxially within said central bore with a lower end portion projecting downward out of said central bore open end to a position below said body lower end, said extendable member being axially movable within said central bore and being rotatably driven by said drive member for rotation with said drive member, said extendable member having a piston portion located within said central bore to define an interior fluid chamber; and
  a third fluid port in fluid communication with said central bore fluid chamber;
 a wheel;
 a wheel support member mounted to said lower end portion of said extendable member for rotation therewith, said wheel being rotatably mounted to said wheel support member in a position to rollingly support the frame, said wheel support member being rotatable by said drive member transmitting rotational force thereto through said extendable member to turn said wheel to steer the frame to the left or right; and
 an accumulator connected to said third fluid port, said central bore fluid chamber and a portion of said accumulator being filled with a substantially non-compressible hydraulic fluid and the remainder of said accumulator being filled with a compressible fluid, said extendable member piston portion moving upward within said central bore in response to upward movement of said wheel to transmit the force of the upward movement through said hydraulic fluid to said compressible fluid in said accumulator for absorption of at least a portion of the transmitted force, whereby said wheel is steered by controlling rotation of said drive member, and shock that would be produced by sudden upward movement of said wheel is transmitted to and absorbed by said compressible fluid to cushion the ride of the frame.

2. The assembly of claim 1, wherein an interior surface portion of said central bore and an exterior surface portion of said extendable member have longitudinally extending, straight splines which mesh together to provide rotational drive from said drive member to said extendable member while permitting uninhibited longitudinal movement of said extendable member within said central bore within at least a limited range.

3. The assembly of claim 2, wherein said extendable member has a stop member to engage an upper end of said central bore splines to limit the extent of downward travel of said extendable member within said central bore.

4. The assembly of claim 1, wherein said extendable member has a stop member to engage said drive member to limit the extent of downward travel of said extendable member within said central bore.

5. The assembly of claim 1, wherein said extendable member has a stop member to engage said drive member to limit the extent of upward travel of said extendable member within said central bore.

6. The assembly of claim 1, wherein said drive member is a hollow shaft with an end cap located toward said body upper end closing an upper open end of said central bore, said third fluid port being formed in said end cap.

7. The assembly of claim 1, wherein said extendable member is slidably disposed within said central bore, and a seal is retained by said drive member within said central bore toward said body lower end to provide a fluidtight seal between said drive member and said extendable member piston portion as said extendable member moves axially within said central bore.

8. A steering assembly for a utility vehicle having a support frame, comprising:
a fluid-powered rotary actuator, including:
a body having a longitudinal axis, and a pair of body ends;
first and second fluid ports for introducing pressurized fluid within said body at longitudinally spaced-apart locations;
a drive member extending generally longitudinally and coaxially within said body, said drive member being supported for rotational movement relative to said body, said drive member having a central elongated bore therein with an open end at one of said body ends;
a piston mounted within said body with said first port in fluid communication with one side thereof and said second port in fluid communication with an opposite side thereof to produce reciprocal longitudinal movement of said piston within said body in response to selective application of pressurized fluid to said first and second ports;
a torque-transmitting member mounted for reciprocal longitudinal movement within said body, said torque-transmitting member engaging said body and said drive member to translate longitudinal movement of said piston toward one of said body ends into rotational movement of said drive member relative to said body in a first rotational direction, and longitudinal movement of said piston toward the other of said body ends into rotational movement of said drive member relative to said body in a second rotational direction opposite said first rotational direction;
an axially extendable member extending generally longitudinally and coaxially within said central bore with an end portion projecting out of said central bore open end to a position beyond said body, said extendable member being axially movable within said central bore and being rotatably driven by said drive member for rotation with said drive member, said extendable member having a piston portion located within said central bore to define an interior fluid chamber; and
a third fluid port in fluid communication with said central bore fluid chamber;
a wheel;
a wheel support member, either one of said body and said extendable member being attached to the frame, and the other being attached to said wheel support member for rotation therewith relative to the frame, said wheel being rotatably mounted to said wheel support member in a position to rollingly support the frame, said wheel support member being rotatable to turn said wheel to steer the frame to the left or right; and
an accumulator connected to said third fluid port, said central bore fluid chamber and a portion of said accumulator being filled with a substantially non-compressible hydraulic fluid and the remainder of said accumulator being filled with a compressible fluid, said extendable member piston portion moving within said central bore in response to upward movement of said wheel to transmit the force of the upward movement through said hydraulic fluid to said compressible fluid in said accumulator for absorption of at least a portion of the transmitted force, whereby said wheel is steered by controlling rotation of said drive member relative to said body, and shock that would be produced by sudden upward movement of said wheel is transmitted to and absorbed by said compressible fluid to cushion the ride of the frame.

9. A fluid-powered steering actuator for a utility vehicle having a support frame, comprising:
a body attached to the frame, said body having a longitudinal axis, and body upper and lower ends;
first and second fluid ports for introducing pressurized fluid within said body at longitudinally spaced-apart locations;
a drive member extending generally longitudinally and coaxially within said body, said drive member being supported for rotational movement relative to said body, said drive member having a central elongated bore therein with an open end at said body lower end;
a piston mounted within said body with said first port in fluid communication with one side thereof and said second port in fluid communication with an opposite side thereof to produce reciprocal longitudinal movement of said piston within said body in response to selective application of pressurized fluid to said first and second ports;

a torque-transmitting member mounted for reciprocal longitudinal movement within said body, said torque-transmitting member engaging said body and said drive member to translate longitudinal movement of said piston toward said body upper end into rotational movement of said drive member relative to said body in a first rotational direction, and longitudinal movement of said piston toward said body lower end into rotational movement of said drive member relative to said body in a second rotational direction opposite said first rotational direction;

an axially extendable member extending generally longitudinally and coaxially within said central bore with a lower end portion projecting downward out of said central bore open end to a position below said body lower end, said extendable member being axially movable within said central bore and being rotatably driven by said drive member for rotation with said drive member, said extendable member having a piston portion located within said central bore to define an interior fluid chamber portion;

a wheel;

a wheel support member mounted to said lower end portion of said extendable member for rotation therewith, said wheel being rotatably mounted to said wheel support member in a position to rollingly support the frame, said wheel support member being rotatable by said drive member transmitting rotational force thereto through said extendable member to turn said wheel to steer the frame to the left or right; and an accumulator chamber portion in fluid communication with said interior fluid chamber portion, said interior fluid chamber portion containing a substantially non-compressible hydraulic fluid and said accumulator chamber portion containing a compressible fluid, said extendable member piston portion moving upward within said central bore in response to upward movement of said wheel to transmit the force of the upward movement through said hydraulic fluid to said compressible fluid for absorption of at least a portion of the transmitted force, whereby said wheel is steered by controlling rotation of said drive member, and shock that would be produced by sudden upward movement of said wheel is transmitted to and absorbed by said compressible fluid to cushion the ride of the frame.

10. The actuator of claim 9, wherein an interior surface portion of said central bore and an exterior surface portion of said extendable member have longitudinally extending, straight splines which mesh together to provide rotational drive from said drive member to said extendable member while permitting uninhibited longitudinal movement of said extendable member within said central bore.

11. The actuator of claim 10, wherein said extendable member has a stop member to engage an upper end of said central bore splines to limit the extent of downward travel of said extendable member within said central bore.

12. The actuator of claim 9, wherein said extendable member has a stop member to engage said drive member to limit the extent of downward travel of said extendable member within said central bore.

13. The actuator of claim 9, wherein said extendable member has a stop member to engage said drive member to limit the extent of upward travel of said extendable member within said central bore.

14. The actuator of claim 9, wherein said drive member is a hollow shaft with an end cap located toward said body upper end closing an upper open end of said central bore.

15. The actuator of claim 9, wherein said extendable member is slidably disposed within said central bore, and a seal is retained by said drive member within said central bore toward said body lower end to provide a fluid-tight seal between said drive member and said extendable member piston portion as said extendable member moves axially within said central bore.

16. A fluid-powered steering actuator for a utility vehicle having a support frame, comprising:

a body having a longitudinal axis, and a pair of body ends;

first and second fluid ports for introducing pressurized fluid within said body at longitudinally spaced-apart locations;

a drive member extending generally longitudinally and coaxially within said body, said drive member being support for rotational movement relative to said body, said drive member having a central elongated bore therein with an open end at one of said body ends;

a piston mounted within said body with said first port in fluid communication with one side thereof and said second port in fluid communication with an opposite side thereof to produce reciprocal longitudinal movement of said piston within said body in response to selective application of pressurized fluid to said first and second ports;

a torque-transmitting member mounted for reciprocal longitudinal movement within said body, said torque-transmitting member engaging said body and said drive member to translate longitudinal movement of said piston toward one of said body ends into rotational movement of said drive member relative to said body in a first rotational direction, and longitudinal movement of said piston toward the other of said body ends into rotational movement of said drive member relative to said body in a second rotational direction opposite said first rotational direction;

an axially extendable member extending generally longitudinally and coaxially within said central bore with an end portion projecting out of said central bore open end to a position beyond said body, said extendable member being axially movable within said central bore and being rotatably driven by said drive member for rotation with said drive member, said extendable member having a piston portion located within said central bore to define an interior fluid chamber portion;

a wheel;

a wheel support member, either one of said body and said extendable member being attached to the frame, and the other being attached to said wheel support member for rotation therewith relative to the frame, said wheel being rotatably mounted to said wheel support member in a position to rollingly support the frame, said wheel support member being rotatable to turn said wheel to steer the frame to the left or right; and an accumulator chamber portion in fluid communication with said interior fluid chamber portion, said interior fluid chamber portion containing a substantially non-compressible hydraulic fluid and said accumulator chamber portion containing a compressible fluid, said extendable member piston portion moving within said central bore in response to upward movement of said wheel to transmit the force of the upward movement through said hydraulic fluid to said compressible fluid for absorption of at least a portion of the transmitted force, whereby said wheel is steered by controlling rotation of said drive member relative to said body, and shock that would be produced by sudden upward movement of said wheel is transmitted to and absorbed by said compressible fluid to cushion the ride of the frame.

17. A steering assembly for a utility vehicle having a support frame, comprising:
a fluid-powered rotary actuator, including:
a body attached to the frame, said body having a longitudinal axis, and body upper and lower ends;
first and second fluid ports for introducing pressurized fluid within said body at longitudinally spaced-apart locations;
a drive member extending generally longitudinally and coaxially within said body, said drive member being supported for rotational movement relative to said body, said drive member having a central elongated bore therein with an open end at said body lower end;
a piston mounted within said body with said first port in fluid communication with one side thereof and said second port in fluid communication with an opposite side thereof to produce reciprocal longitudinal movement of said piston within said body in response to selective application of pressurized fluid to said first and second ports;
a torque-transmitting member mounted for reciprocal longitudinal movement within said body, said torque-transmitting member engaging said body and said drive member to translate longitudinal movement of said piston toward said body upper end into rotational movement of said drive member relative to said body in a first rotational direction, and longitudinal movement of said piston toward said body lower end into rotational movement of said drive member relative to said body in a second rotational direction opposite said first rotational direction;
an axially extendable member extending generally longitudinally and coaxially within said central bore with a lower end portion projecting downward out of said central bore open end to a position below said body lower end, said extendable member being axially movable within said central bore and being rotatably driven by said drive member for rotation with said drive member, said extendable member having a piston portion located within said central bore to define an interior fluid chamber; and
a third fluid port in fluid communication with said central bore fluid chamber, the application of pressurized fluid to said third port causing said extendable member to move downward within said central bore;
a wheel; and
a wheel support member mounted to said lower end portion of said extendable member for rotation therewith, said wheel being rotatably mounted to said wheel support member in a position to rollingly support the frame, said wheel support member being rotatable by said drive member transmitting rotational force thereto through said extendable member to turn said wheel to steer the frame to the left or right, whereby said wheel is steered by controlling rotation of said drive member, and said extendable member is extendable by the application of pressurized fluid to said third port to raise the frame relative to said wheel.

18. The assembly of claim 17, wherein an interior surface portion of said central bore and an exterior surface portion of said extendable member have longitudinally extending, straight splines which mesh together to rotational drive from said drive member to said extendable member while permitting uninhibited longitudinal movement of said extendable member within said central bore within at least a limited range.

19. The assembly of claim 18, wherein said extendable member has a stop member to engage an upper end of said central bore splines to limit the extent of downward travel of said extendable member within said central bore.

20. The assembly of claim 17, wherein said extendable member has a stop member to engage said drive member to limit the extent of downward travel of said extendable member within said central bore.

21. The assembly of claim 17, wherein said extendable member has a stop member to engage said drive member to limit the extent of upward travel of said extendable member within said central bore.

22. The assembly of claim 17, wherein said drive member is a hollow shaft with an end cap located toward said body upper end closing an upper open end of said central bore, said third fluid port being formed in said end cap.

23. The assembly of claim 17, wherein said extendable member is slidably disposed within said central bore, and a seal is retained by said drive member within said central bore toward said body lower end to provide a fluid-tight seal between said drive member and said extendable member piston portion as said extendable member moves axially within said central bore.

* * * * *

UNITED STATES PATENT AND TRADEMARK OFFICE
CERTIFICATE OF CORRECTION

PATENT NO. : 5,253,726
DATED : October 19, 1993
INVENTOR(S) : Paul P. Weyer

It is certified that error appears in the above-identified patent and that said Letters Patent is hereby corrected as shown below:

In column 16, claim 18, lines 28 and 29, after "together to" and before "rotational drive", please insert --provide--.

Signed and Sealed this

Nineteenth Day of July, 1994

BRUCE LEHMAN

Attest:

Attesting Officer

Commissioner of Patents and Trademarks